United States Patent [19]

Allinquant et al.

[11] 3,904,182
[45] Sept. 9, 1975

[54] HYDRAULIC SHOCK ABSORBER AND PNEUMATIC SPRING DEVICE

[76] Inventors: Fernand Michel Allinquant, 53, Avenue Le Notre; Jacques Gabriel Allinquant, 12, Avenue Arouet, both of 92-Sceaux, France

[22] Filed: Oct. 12, 1973

[21] Appl. No.: 405,889

[30] Foreign Application Priority Data
Oct. 30, 1972   France .............................. 72.38457

[52] U.S. Cl. ............... 267/64 R; 188/269; 188/282; 188/314; 213/43; 293/DIG. 2
[51] Int. Cl. ............................................. F16f 9/06
[58] Field of Search ........... 188/269, 314, 322, 320, 188/279, 316, 282; 213/43; 267/64 R; 293/DIG. 2

[56] References Cited
UNITED STATES PATENTS

| | | | |
|---|---|---|---|
| 1,855,064 | 4/1932 | Messier .............................. | 188/269 |
| 2,760,604 | 8/1956 | Wyeth .............................. | 188/320 X |
| 3,139,290 | 6/1964 | Swick .............................. | 213/43 X |
| 3,163,262 | 12/1964 | Allinquant ....................... | 188/314 X |
| 3,205,789 | 9/1965 | Mandelko ......................... | 188/269 X |
| 3,731,771 | 5/1973 | Borgo .............................. | 188/314 X |
| 3,804,216 | 4/1974 | Katsumori et al. ................. | 188/269 |

FOREIGN PATENTS OR APPLICATIONS

| | | | |
|---|---|---|---|
| 697,799 | 10/1940 | Germany ........................... | 188/320 |
| 713,318 | 8/1954 | United Kingdom................. | 188/269 |
| 1,037,083 | 7/1966 | United Kingdom................. | 188/269 |

*Primary Examiner*—George E. A. Halvosa
*Attorney, Agent, or Firm*—Staas & Halsey

[57] ABSTRACT

An oleopneumatic shock absorber for use in a horizontal position including a first tube closed at both ends and containing hydraulic fluid and gas under pressure, the first tube being mounted to slide telescopically within a second tube, the space between the tubes defining a compression chamber which is filled with hydraulic fluid, and a constricted passageway extending from the compression chamber to the interior of the first tube permitting hydraulic fluid to enter the first tube below the level of hydraulic fluid therein.

8 Claims, 1 Drawing Figure

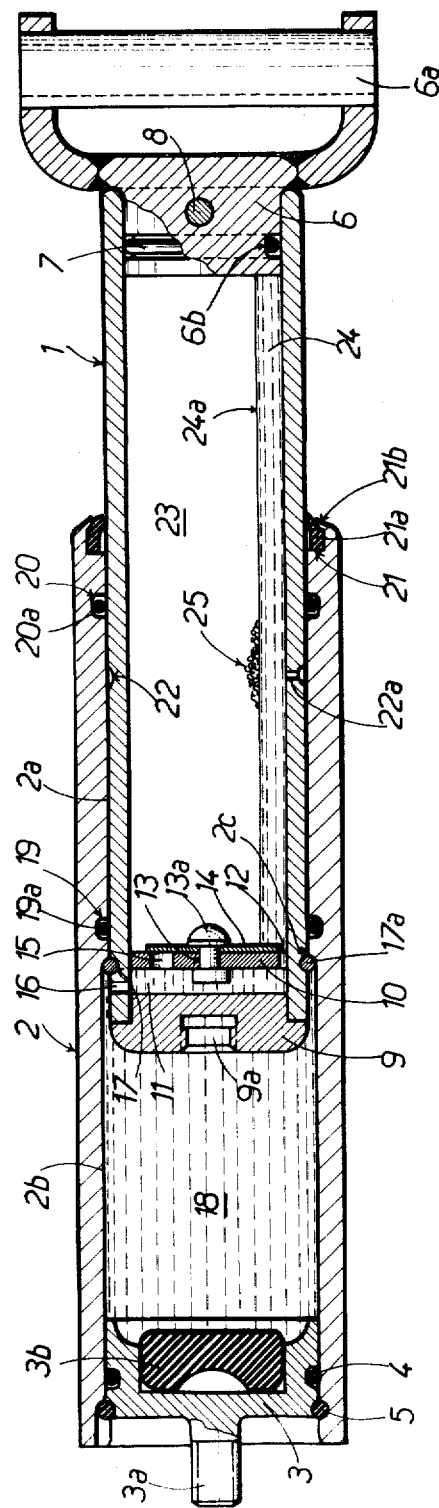

HYDRAULIC SHOCK ABSORBER AND PNEUMATIC SPRING DEVICE

This invention relates to an oleopneumatic shock absorber capable of absorbing at least part of the energy involved in the collision of two bodies in relative motion and for preventing or lessening permanent deformation due to such collisions.

The oleopneumatic shock absorber according to the invention comprises a first tube closed at its two extremities and containing a predetermined amount of hydraulic fluid and gas under pressure. The first tube is able to slide telescopically within a second tube the space between the tube defines a compression chamber filled with hydraulic fluid, and a constricted passage running from the compression chamber and terminating in the interior of the first tube below the hydraulic fluid level.

The invention also concerns an improvement in the fitting of motor vehicle bumpers. Bumpers frequently tend to buckle at collision while protecting the basic structure, for example, the chassis and bodywork, of vehicles. However, it seems desirable to prevent the bumpers themselves from being damaged or buckled permanently by small collisions such as take place when a vehicle moving at low speed stikes an obstacle or the bumper of another vehicle.

According to the present invention, a bumper is fitted in a resilient manner and damped by means of a device comprising a pneumatic spring damped by a braked hydraulic flow, so that a light blow causes slight retraction of the bumper which then resumes its initial position under the action of the said device.

The damped pneumatic spring is favourably an oleopneumatic shock absorber as defined above.

When the oleopneumatic shock absorber according to the invention is arranged horizontally, as is the case if it is used for fitting a motor vehicle bumper, the constricted passage running from the compression chamber must terminate near the lower generating part of the first tube, preferably across a partition located close to the extremity of the latter contained inside the second tube. In one embodiment this partition is spaced by a bottom closing the adjacent extremity of the first tube, and the space between the partition and this bottom communicates with the compression chamber through one or several orifices having small cross-sections and with the interior of the first tube by an opening of small crosssection made in the lower part of the said partition and by one or several holes passing through this and controlled by a check-valve which only allows the fluid to flow from the said space towards the interior of the first tube.

The invention will now be further described, by way of example, with reference to the accompanying drawing, which shows a longitudinal sectional view of an oleopneumatic shock absorber according to the present invention fitted for the mounting of a motor vehicle bumper.

To mount a bumper on a motor vehicle, two shock absorbers similar to the one shown can, for example, be used.

An inner tube 1 is able to slide telescopically inside an outer tube 2, which is bored at 2a, over about a half of its length, to the external diameter of tube 1 so as to guide the telescopic sliding. The remaining portion of tube 2 is counter-bored at 2b to a slightly larger diameter. The outer extremity of this counter-bored portion is closed by a stopper 3 provided externally with a threaded rod 3a intended to be fixed to the chassis of a motor vehicle (not shown). This stopper 3 is provided with a seal 4 and is held in the tube 1 by a retaining ring 5 inserted into two complementary seatings made respectively in the stopper and the wall of the tube. The seal 4 thus seals the interior of tube 2 from the atmosphere.

The outer end of tube 1 is closed by a stopper 6 provided externally with an attaching part 6a to which a bumper (not shown) may be attached. The tightness of the closure is ensured by an O-ring 7 seated in a groove 6b of stopper 6; this O-ring 7 completely seals the interior of tube 1 from the outer atmosphere. A locking pin 8 holds the stopper 6 in position. The internal end of tube 1 is closed by a plug 9 which has been fitted by means of a tool (not shown) into a threaded recessed hole 9a and then withdrawn. As a variant, the plug 9 could be fixed to tube 1 by a weld (not shown).

Inside tube 1 and close to plug 9 is fixed by any suitable means (for example by a weld which is not shown) a metal disc 10 forming a transverse partition defining a chamber 11 between itself and plug 9. The disc 10 has extending through its periphery a slot-like recess forming a constricted passageway 12 permanently allowing liquid flow in both directions while offering resistance thereto. Disc 10 has in addition a hole 13 through its centre. The hole 13 has a rivet 13a extending through it which rivet secures, on the face of the disc facing away from the plug 9, a thin resilient flap which acts as a check valve 14 closing a large passageway or orifice 15 drilled in disc 10 and having a passage area substantially larger than that of the constricted passageway 12 with which it is in spaced parallel flow relationship. It should be observed that slot 12 is made in the lower part of disc 10, i.e. against the lower internal surface of tube 1, and that the latter is not able to rotate after fitting, since the locking pin 8 will prevent it from turning in relation to the stopper 6 fixed to the bumper (not shown). Slot 12 will thus always be located in the lower part of the shock absorber. The wall of tube 1 is traversed, against plug 9, by a constricted passageway 16 which opens into chamber 11 and permanently allows liquid flow in both directions while offering resistance thereto.

In the external surface of tube 1, approximately opposite partition 10, is a groove 17 in which is seated a segment 17a, which is able to slide inside the counter-bore 2b but which limits the intensive stroke of inner tube 1 out of outer tube 2 by abutting the shoulder forming stepped junction 2c located between this counter-bore 2b and bore 2a. It will be seen in the drawing that tube 1 defines in tube 2 a variable volume plenum 18 which communicates with chamber 11 via the constricted passageway 16. In stopper 3 is seated a block of elastomeric material 3b which plug 9 will be able to abut should the telescopic damper be completely retracted.

Near the two ends of bore 2a are two grooves, respectively 19, 20, in which are seated seals 19a, 20a. At the outer end of this bore 2a, tube 2 is provided with a recess 21 in which is seated a lip joint 21a held by crimping in 21b and serving to clean the external surface of tube 1.

In the part of the external surface of tube 1 which is always located between seals 19a and 20a during the telescopic sliding of tube 1 is provided a circular groove 22 which communicates with the interior of tube 1 by a small port 22a passing through the wall of the latter.

The variable volume plenum 18 is filled with a non-freezing hydraulic fluid which also fills intermediate chamber 11 and part of which flows through the slot 12 into the interior space 23 of tube 1 and bottoms therein an amount of hydraulic liquid 24 of which the free level 24a is above the level of slot 12 when the damper is in the position of complete extension illustrated in the drawing. On the free level 24a of this liquid has been placed a sublimatable product 25 such as dry ice, in such a way that the part of the chamber 23 located above this free level is filled with an overtopping amount of gas under pressure which acts on the underlying hydraulic fluid. The pressure of this gas is, preferably, greater than or equal to 10 bars in the position of the damper represented in the drawing, so that the inner space 23 of tube 1 operates as a constant-volume pneumatic spring chamber.

The damper functions as follows; the gas pressure in 23 being exerted on the hydraulic fluid keeps the damper in the illustrated position of full extension in which segment 17a is stopped against shoulder 2c. If a blow is applied to the bumper mounted on the attaching part 6a of stopper 6, stopper 3 of tube 2 being fixed to the vehicle by its threaded rod 3a, tube 1 plunges telescopically inside tube 2, producing a flow of hydraulic fluid from the variable volume plenum 18 into the constant-volume pneumatic spring chamber 23 and, accordingly, increases the pressure of the gas enclosed in the latter. The flow of hydraulic fluid takes place from plenum 18 into intermediate chamber 11 through the first constricted passageway 16 which causes a slowing down of the flow, i.e. the fall in pressure necessary for the dissipation of the energy of the impact, and from intermediate chamber 11 into chamber 23 through the second constricted passageway 12 and, also through the third passageway 15, the valve 14 being deflectable away therefrom under the effect of the excess pressure produced in the intermediate chamber 11, into which the hydraulic fluid coming from plenum 18 flows at great speed and at high pressure, so as to prevent this excess pressure reaching a dangerous level. It will be understood that it is the mass of hydraulic fluid thus penetrating into chamber 23 which compresses the gas contained in the latter, so that this gas acts as a pneumatic spring.

When the impact has been absorbed and the vehicle disengaged from the obstacle which has caused the impact, the very high pressure of the gas in chamber 23 in effect acts on the surface 24a of the hydraulic fluid and makes it flow back through the second constricted passageway 12 into the intermediate chamber 11 and thence through the first constricted passageway 16 into the plenum 18, thus causing tube 1 to extend telescopically out of tube 2 until segment 17a again comes up against shoulder 2c. This movement is very slow, since the flow of the hydraulic fluid is retarded by the constricted passageway 12 and 16, but there is no disadvantage arising from this because, in general, there are no further collisions between motor vehicles following a first collision.

It should be noted that seals 4 and 7 are static seals which can easily be devised to be tight at high pressures. As far as seals 19a and 20a, which are sliding seals, are concerned, they can together provide a satisfactory tightness to the high pressure which is established in plenum 18 when the shock absorber is functioning. In fact, the part of the interstice between the guide boring 2a and tube 1 contained between these two seals 19a and 20a communicates with the hydraulic fluid at 24 through part 22a, so that while the shock absorber is functioning as the result of an impact, an intermediate pressure, lower than the high pressure of plenum 18, is created between these two seals. Seal 19a thus works between a high pressure and an average pressure and seal 20a between this intermediate pressure and the atmospheric pressure.

It should also be noted that an impact produces a high compression of the hydraulic fluid in plenum 18 but that the high pressure thus generated in this plenum 18 is transmitted to neither chamber 11 nor chamber 23, since the constricted passageway 16 brings about a very considerable fall in pressure which dissipates the energy of the impact.

To prevent deterioration of the apparatus by violent impacts, a spring-loaded safety valve (not shown) can be provided in plug 9 to open when the pressure in plenum 18 exceeds a predetermined level, so as to allow the hydraulic fluid to pass into chamber 11. Owing to this arrangement, the fluid compressed inside plenum 18 by a violent impact will escape quickly through the safety valve and the wide passageway 15 into chamber 23, by-passing the two consecutive constricted passageways 16 and 12.

We claim:

1. In a fender shock absorber of the type provided with an outer tube having a liquidtight closure at one end thereof and supported to extend horizontally, a likewise horizontally extending inner tube telescopically engaging said outer tube through the other end thereof and having an inner terminal section located inside said outer tube opposite said closure to define therewith and with the wall of said outer tube a variable-volume plenum filled with hydraulic liquid, and an outer terminal section projecting outside said outer tube and sealed to define with said inner terminal section and the wall of said inner tube a constant-volume pneumatic spring chamber containing an underlying amount of hydraulic liquid at a lowermost region thereof and an overtopping amount of gas under pressure above the liquid level therein, locking means associated with said sealed outer terminal section for securing said inner tube against angular displacement about the axis thereof thereby angularly locating said lowermost region of said pneumatic spring chamber, the improvement comprising a liquid flow control mechanism fitted at said inner terminal section of said horizontally extending inner tube, said control mechanism comprising the combination of:

a plug secured to the extremity of said inner terminal section, a transverse partition secured to said inner terminal section in axially spaced relationship with said plug towards the outer terminal section of said inner tube to define with said plug a chamber intermediate said variable-volume plenum and said constant-volume pneumatic spring chamber, a first constricted passageway connecting said plenum with said intermediate chamber and permanently allowing liquid flow in both directions while offering resistance thereto, a second constricted passageway connecting said intermediate chamber with said lowermost region below said liquid level in said pneumatic spring chamber and permanently allowing liquid flow in both directions while offering resistance thereto, a third passageway formed through said partition to connect said intermediate chamber with said pneumatic spring chamber in spaced parallel flow relationship with said second constricted passageway, said third passageway having a passage area substantially larger than that of said second constricted passageway, and a check valve associated with said third passageway to permit flow therethrough from said intermediate chamber towards said pneumatic spring chamber upon plunging movement of said inner tube into said outer tube, while hindering flow in the opposite direction upon extension movement of said inner tube out of said outer tube.

2. A fender shock absorber as in claim 1, wherein said second constricted passageway is formed through said transverse partition at its lowermost portion, adjacent the wall of said inner tube.

3. A fender shock absorber as in claim 2, wherein said transverse partition is generally disc-shaped, and said second constricted passageway is in the form of a slot-like recess at the periphery of said disc-shaped partition.

4. A fender shock absorber as in claim 1, wherein said check valve comprises a resilient flap secured to the side of said transverse partition which faces towards said outer terminal section, said flap being biased to an obturating position with respect to said third passageway and being deflectable away therefrom upon exertion of liquid pressure overreaching a threshold value.

5. A fender shock absorber as in claim 1, wherein said outer tube comprises an open-ended first tubular portion remote from said liquidtight closure and having an internal diameter substantially equal to the external diameter of said inner tube whereby said inner tube is slidably guided by said tubular portion, and a second tubular portion adjacent said liquidtight closure and integral with said first tubular portion, said second tubular portion having an internal diameter larger than that of said first tubular portion and being connected thereto through a stepped junction.

6. A fender shock absorber as in claim 5, wherein said inner tube comprises an external projection located adjacent said inner terminal section thereof to form a stop adapted to abut against said stepped junction and limit the extension movement of said inner tube out of said outer tube.

7. A fender shock absorber as in claim 5, wherein said outer tube further comprises a pair of annular sealing rings positioned within two axially spaced recesses formed in said first tubular portion and engaging the outer surface of said inner tube.

8. A fender shock absorber as in claim 7, wherein said inner tube comprises a peripheral groove-and-port system formed in the wall thereof and interconnecting the inner and outer surfaces of said inner tube, said groove-and-port system being located intermediate said annular sealing rings throughout the plunging extension stroke of said inner tube.

\* \* \* \* \*